(12) United States Patent
Zheng et al.

(10) Patent No.: US 9,729,501 B2
(45) Date of Patent: Aug. 8, 2017

(54) SYSTEM AND DATA CARD FOR STATELESS AUTOMATIC CONFIGURATION OF IPV6 ADDRESS AND METHOD FOR IMPLEMENTING THE SAME

(71) Applicant: ZTE Corporation, Shenzhen, Guangdong (CN)

(72) Inventors: Wei Zheng, Shenzhen (CN); Hailong Wen, Shenzhen (CN); Leshen Hu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 242 days.

(21) Appl. No.: 14/416,250

(22) PCT Filed: Jul. 22, 2013

(86) PCT No.: PCT/CN2013/079803
§ 371 (c)(1),
(2) Date: Jan. 21, 2015

(87) PCT Pub. No.: WO2014/015775
PCT Pub. Date: Jan. 30, 2014

(65) Prior Publication Data
US 2015/0180823 A1   Jun. 25, 2015

(30) Foreign Application Priority Data

Jul. 25, 2012   (CN) .......................... 2012 1 0259502

(51) Int. Cl.
*G06F 15/177* (2006.01)
*H04L 29/12* (2006.01)
*H04L 12/701* (2013.01)

(52) U.S. Cl.
CPC .......... *H04L 61/2007* (2013.01); *H04L 29/12* (2013.01); *H04L 45/00* (2013.01); *H04L 61/2092* (2013.01); *H04L 61/6059* (2013.01)

(58) Field of Classification Search
CPC ............. H04L 61/2092; H04L 61/6059; H04L 61/2007; H04L 29/12216; H04L 45/00
(Continued)

(56) References Cited

U.S. PATENT DOCUMENTS 9,344,402 B2 * 5/2016 Liu ...................... H04L 61/2007
2001/0017856 A1 * 8/2001 Asokan .................. H04L 29/06
370/389

(Continued)

FOREIGN PATENT DOCUMENTS

CN   101753635 A   6/2010
CN   102137170 A   7/2011
(Continued)

OTHER PUBLICATIONS

Considerations on M and 0 Flags of IPv6 Router Advertisement, XP015038443, mailed on Mar. 26, 2005.
(Continued)

*Primary Examiner* — Phuoc Nguyen
(74) *Attorney, Agent, or Firm* — Oppedahl Patent Law Firm LLC

(57) ABSTRACT

Disclosed are a system and data card for stateless automatic configuration of an IPv6 address and the method for implementing the same, and the method includes: an IPv6 address configuration way of a data card is set and stored according to an IPv6 address allocation strategy of a current network, after successful establishment of an IPv6 dialup connection and reception of a router advertisement request message transmitted by a terminal for acquiring a prefix address, the data card determines the set IPv6 address allocation way,
(Continued)

and when the set IPv6 address allocation way is a static configuration way, a router advertisement response message is discarded and a valid IPv6 global unicast address is reported to the terminal. By means of the system, data card and method, it is possible to solve a problem that data transmission can not be normally performed by an existing data card implementing dialup in an Ethernet link way when interface identifiers are allocated by a network.

9 Claims, 4 Drawing Sheets

(58) Field of Classification Search
USPC .................................................. 709/220, 245
See application file for complete search history.

(56) References Cited

U.S. PATENT DOCUMENTS

| | | | |
|---|---|---|---|
| 2005/0117590 A1* | 6/2005 | Ronneke | H04L 29/1232 370/395.52 |
| 2007/0268919 A1* | 11/2007 | Sarikaya | H04L 29/12207 370/401 |
| 2008/0031189 A1* | 2/2008 | Choi | H04L 29/12216 370/329 |
| 2008/0107067 A1 | 5/2008 | Baek | |
| 2010/0067509 A1 | 3/2010 | Lambert | |
| 2011/0228734 A1* | 9/2011 | Laganier | H04L 29/12283 370/329 |
| 2012/0300762 A1 | 11/2012 | Lambert | |
| 2013/0250934 A1 | 9/2013 | Lambert | |

FOREIGN PATENT DOCUMENTS

| | | |
|---|---|---|
| CN | 102340452 A | 2/2012 |
| CN | 102594940 A | 7/2012 |
| CN | 102833732 A | 12/2012 |
| EP | 1926287 A1 | 5/2008 |
| WO | 2011116349 A1 | 9/2011 |

OTHER PUBLICATIONS

IPv6 Stateless Address Autoconfiguration, XP015008246, mailed on Dec. 1, 1998.
Privacy Extensions for Stateless Address Autoconfiguration in IPv6, XP015052477, mailed on Sep. 1, 2007.
Supplementary European Search Report in European application No. 13822259.1, mailed on Jun. 12, 2015.
International Search Report in international application No. PCT/CN2013/079803, mailed on Oct. 24, 2013. (3 pages—see entire document).
English Translation of the Written Opinion of the International Search Authority in international application No. PCT/CN2013/079803, mailed on Oct. 24, 2013. (16 pages—see entire document).

* cited by examiner

SYSTEM AND DATA CARD FOR STATELESS AUTOMATIC CONFIGURATION OF IPV6 ADDRESS AND METHOD FOR IMPLEMENTING THE SAME

TECHNICAL FIELD

The present disclosure relates to the field of mobile communications, and in particular to a system and data card for stateless automatic configuration of an Internet Protocol Version (IPv6) address and a method for implementing the same.

BACKGROUND

IPv6 has advantages such as large address space, easy to implement address aggregation due to its address structure, supporting automatic address configuration and supporting host mobility, and IPv6 has better security and service quality than IPv4. Both a Universal Mobile Telecommunications System of the 3rd Generation Partnership Project (3GPP) and a Code Division Multiple Access (CDMA) 2000 system of the 3GPP2 have regarded IPv6 as a development direction for networking bearing and service applications. Especially in a 3G IP Multimedia System (IMS) stage, network systems will be entirely based on or compatible to IPv6. IPv6 has been a common basic protocol for the Internet and mobile communication networks. Global ipv4 address resources of the Internet are drying up, this will further accelerate application of IPv6 techniques in 3G networks and terminals.

An IPv6 address consists of a prefix address and an interface identifier, high 64 bits of the IPv6 address are the prefix address and low 64 bits are the interface identifier. In 3GPP specifications, both the interface identifier and the prefix address are allocated by a network in a two-stage way: in a first stage, a data card acquires an interface identifier from a Gateway GPRS Support Node (GGSN), and this stage is completed by a Packet Data Protocol (PDP) context activation process; in a second signaling stage, the data card acquires a prefix address desired by a global IPv6 address from the GGSN by using a Router Solicitation (RS) message and a Router Advertisement (RA) message. A host in communication with the data card has two types of IPv6 addresses, one is a link-local address which is a link-local unicast address generated from a link-local prefix address 1111111010 and an interface identifier for use in host communications within an LAN, and an IPv6 data packet with a link-local address will not be forwarded to external networks by a router. The other is a global unicast address, a terminal can communicate with other terminals in external data networks by using only a global IPv6 address, i.e., communicate with hosts of other terminals. There are two ways for automatically configuring a global unicast address, one is Stateless Automatic Address Configuration (SLAAC), the other is Dynamic Host Configuration Protocol for IPv6 (DHCPv6).

Specifically, since a data card is required to support a DHCPv6 server functionality when a DHCPv6 stateful automatic address configuration is used, at present all data cards supporting IPv6 perform address distribution in an SLAAC way. When the SLAAC is used, a network has two ways for allocation an IPv6 address, one is allocation of a unique prefix address, the other is allocation of a unique network Interface Identifier (IID) address. When what the network allocates is a prefix address, it indicates that the network receives any IPv6 address including the prefix address, that is to say, a host can perform data transmission by using any IPv6 address including the prefix address. During IPv6 address negotiation, after acquiring a prefix address from a data card side through a router advertisement message, the host only needs to generate randomly an interface identifier, which together with the prefix address forms a 128-bit IPv6 address.

However, when what the network allocates is an interface identifier, it indicates that the network receives only an IPv6 address consisting of the interface identifier and a prefix address acquired through a router advertisement message and which is a unique global unicast address, and the host can perform data transmission by using only this IPv6 address rather than using an IPv6 address including a randomly-generated interface identifier. In the case when an IPv6 address is allocated in this way, an IPv6 dialup process implemented in a Point-to-Point Protocol (PPP) link way can successfully allocate interface identifiers allocated by a network to a host, thus an IPv6 address generated through stateless automatic address configuration by a host performing dialup in a PPP link way is namely a unique global unicast address issued by the network. However, during an IPv6 dialup process implemented in an Ethernet link way, through a router advertisement message a host can acquire from a data card only a prefix address rather than an allocated interface identifier, thus in an IPv6 address generated in a stateless automatic address configuration way, a randomly-generated interface identifier is used, an IPv6 address consisting of the randomly-generated interface identifier and the prefix address is not consistent with a unique global unicast address allocated by the network, thus the network side can not normally route data packets transmitted by a host using the IPv6 address, therefore making it impossible to normally perform data transmission through an IPv6 connection.

SUMMARY

In view of the above, embodiments of the present disclosure are intended to provide a system and data card for stateless automatic configuration of an IPv6 address and a method for implementing the same, which can solve a problem that data transmission can not be normally performed by an existing data card implementing dialup in an Ethernet link way when interface identifiers are allocated by a network.

To this end, the technical solutions of embodiments of the present disclosure are implemented as follows.

Embodiments of the present disclosure provide a system for stateless automatic configuration of an IPv6 address, and the system includes a data card and a terminal, wherein the data card is configured to set and store its own IPv6 address configuration way according to an IPv6 address allocation strategy of a current network, determine the set IPv6 address allocation way after successful establishment of an IPv6 dialup connection and reception of a router advertisement request message transmitted by the terminal for acquiring a prefix address, and when the set IPv6 address allocation way is determined as a static configuration way, discard a router advertisement response message and report a valid IPv6 global unicast address to the terminal; and the terminal is configured to, after successful establishment of the IPv6 dialup connection, transmit a router advertisement request message for acquiring a prefix address to the data card and receive a valid IPv6 global unicast address reported by the data card.

In an embodiment, the data card may be further configured to, after the IPv6 address allocation way is determined as a stateless automatic address configuration way, return a router advertisement response message carrying a prefix address to the terminal;

accordingly, the terminal may be further configured to generate randomly an interface identifier according to a prefix address carried in a router advertisement response message transmitted by the data card, and combine the interface identifier and the prefix address to form an IPv6 global unicast address.

Embodiments of the present disclosure further provide a data card for stateless automatic configuration of an IPv6 address, the data card is configured to set and store its own IPv6 address configuration way according to an IPv6 address allocation strategy of a current network, determine the set IPv6 address allocation way after successful establishment of an IPv6 dialup connection and reception of a router advertisement request message transmitted by a terminal for acquiring a prefix address, and when the set IPv6 address allocation way is determined as a static configuration way, discard a router advertisement response message and report a valid IPv6 global unicast address to the terminal.

In an embodiment, the data card may be further configured to, after the IPv6 address allocation way is determined as a stateless automatic address configuration way, return a router advertisement response message carrying a prefix address to the terminal.

The data card may include a control instruction module, a router message processing module, an IPv6 address processing module and a dialup module, wherein the router message processing module is configured to, before establishment of a dialup connection, set and store an IPv6 address configuration way of the data card according to the IPv6 address allocation strategy of the current network; after successful establishment of the IPv6 dialup connection, determine the set IPv6 address allocation way, and when the set IPv6 address allocation way is determined as a static configuration way, discard a router advertisement response message and notify the IPv6 address processing module;

the IPv6 address processing module is configured to, after receiving a notification transmitted by the router message processing module, acquire a valid IPv6 global unicast address from a Packet Data Protocol (PDP) activation message and provide the IPv6 global unicast address to the control instruction module;

the control instruction module is configured to transmit a control instruction carrying the IPv6 address to a PC side software; and the dialup module is configured to, when the data card receives a dialup request, initiate a PDP activation process, and acquire a valid IPv6 global unicast address from a network side.

In an embodiment, the router message processing module may be further configured to, after the set IPv6 address allocation way is determined as a stateless automatic address configuration way, receive a prefix address transmitted by the IPv6 address processing module and return a router advertisement response message carrying the prefix address to the terminal;

accordingly, the IPv6 address processing module may be further configured to return the prefix address to the router message processing module.

Embodiments of the present disclosure further provide a method for implementing stateless automatic configuration of an IPv6 address, which sets and stores an IPv6 address configuration way of a data card according to an IPv6 address allocation strategy of a current network, and the method includes:

after successful establishment of an IPv6 dialup connection and reception of a router advertisement request message transmitted by a terminal for acquiring a prefix address, the data card determines the set IPv6 address allocation way, and when the set IPv6 address allocation way is a static configuration way, a router advertisement response message is discarded and a valid IPv6 global unicast address is reported to the terminal.

The method may further include:

when the IPv6 address allocation way is a stateless automatic address configuration way, a router advertisement response message carrying a prefix address is returned to the terminal, the terminal generates randomly an interface identifier, and combines the interface identifier and the prefix address to form an IPv6 global unicast address.

In an embodiment, the setting an IPv6 address configuration way of a data card according to an IPv6 address allocation strategy of a current network may include:

the IPv6 address allocation strategy of the current network is determined before a dialup, when what the current network allocates is a prefix address, the IPv6 address configuration way of the data card is set to a stateless automatic address configuration way; when what the current network allocates is an interface identifier, the IPv6 address configuration way of the data card is set to a static configuration way; above setting processes are implemented through an AT instruction.

In an embodiment, the discarding a router advertisement response message and reporting a valid IPv6 global unicast address to the terminal may include:

the data card discards the router advertisement response message, and notifies an IPv6 address processing module within the data card itself to acquire a valid IPv6 global unicast address from a PDP activation message, and provides the IPv6 address to a control instruction module; the control instruction module transmits a control instruction carrying the valid IPv6 global unicast address to a PC side software of the terminal; and after receiving the control instruction carrying the valid IPv6 global unicast address, the PC side software calls an interface of an operation system to set the IPv6 address to a host in the terminal.

In a system and data card for stateless automatic configuration of an IPv6 address and the method for implementing the same provided by embodiments of the present disclosure, an IPv6 address configuration way of a data card is set and stored according to an IPv6 address allocation strategy of a current network, after successful establishment of an IPv6 dialup connection and reception of a router advertisement request message transmitted by a terminal for acquiring a prefix address, the data card determines the set IPv6 address allocation way, and if the set IPv6 address allocation way is a static configuration way, a router advertisement response message is discarded and a valid IPv6 global unicast address is reported to the terminal. In embodiments of the present disclosure, an existing process for processing a router advertisement message is modified, and in the case that an interface identifier is allocated by a network, a stateless automatic address configuration function of an end host side is disabled through discard of a router advertisement response message returned to a terminal by a data card, then the data card transmits to the terminal a valid IPv6 address allocated by the network through a PDP activation response message. It can be seen that embodiments of the present disclosure can solve a problem that data transmission can not be normally performed by an existing data card implementing dialup in an Ethernet link way, due to a fact that an IPv6 address randomly-generated by a terminal is not consistent with an IPv6 address allocated by a network, when interface identifiers are allocated by the network so that a data card having an IPv6 data transmission function can be compatible simultaneously to two types of networks having different address allocation ways.

DETAILED DESCRIPTION

Figure 1:
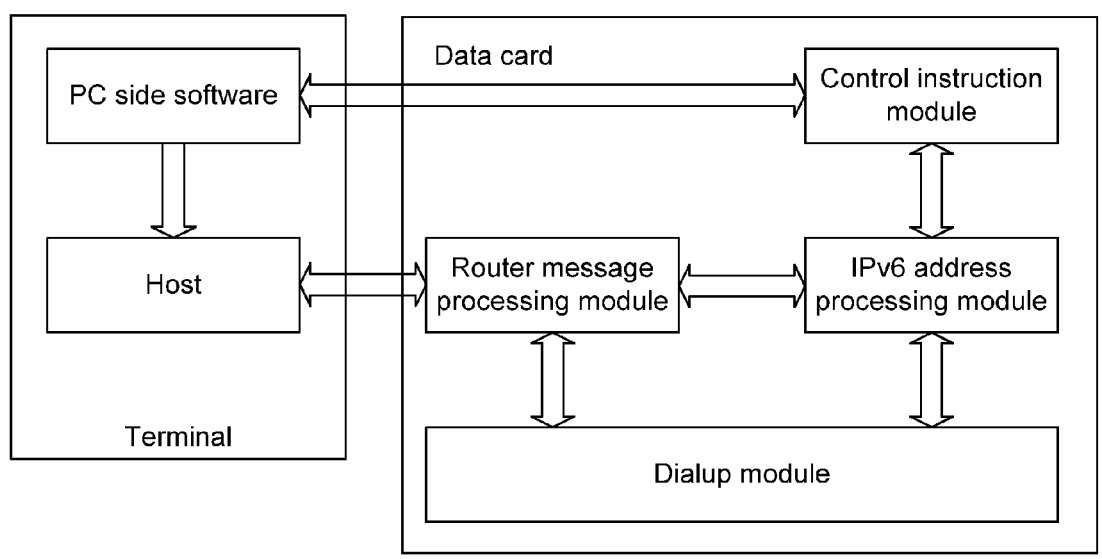
FIG. 1 is a schematic structural diagram of a system for stateless automatic configuration of an IPv6 address according to an embodiment of the present disclosure.

In an embodiment of the present disclosure, an IPv6 address configuration way of a data card is set and stored according to an IPv6 address allocation strategy of a current network, after successful establishment of an IPv6 dialup connection and reception of a router advertisement request message transmitted by a terminal for acquiring a prefix address, the data card determines the set IPv6 address allocation way, and if the set IPv6 address allocation way is a static configuration way, a router advertisement response message is discarded and a valid IPv6 global unicast address is reported to the terminal.

In an embodiment, if the configuration way is a stateless automatic address configuration way, a router advertisement response message carrying a prefix address is returned to the terminal, the terminal generates randomly an interface identifier, and combines the interface identifier and the prefix address to form an IPv6 global unicast address.

Herein the IPv6 address configuration way of the data card includes a stateless automatic address configuration way and a static configuration way.

It should be noted that embodiments of the present disclosure are mainly aimed at an IPv6 dialup implemented in an Ethernet link way, and for an IPv6 dialup implemented in a PPP link way, it does not need to use technical solutions according to embodiments of the present disclosure.

The present disclosure will be further elaborated below in combination with accompanying drawings and specific embodiments.

Embodiments of the present disclosure provide a system for stateless automatic configuration of an IPv6 address, and the system includes a data card and a terminal, wherein the data card is configured to set and store its own IPv6 address configuration way according to an IPv6 address allocation strategy of a current network, determine the set IPv6 address allocation way after successful establishment of an IPv6 dialup connection and reception of a router advertisement request message transmitted by the terminal for acquiring a prefix address, and when the set IPv6 address allocation way is determined as a static configuration way, discard a router advertisement response message and report a valid IPv6 global unicast address to the terminal; and the terminal is configured to, after successful establishment of the IPv6 dialup connection, transmit a router advertisement request message for acquiring a prefix address to the data card and receive a valid IPv6 global unicast address reported by the data card.

The data card is further configured to, after the IPv6 address allocation way is determined as a stateless automatic address configuration way, return to the terminal a router advertisement response message carrying a prefix address;

Accordingly, the terminal is further configured to generate randomly an interface identifier according to a prefix address carried in a router advertisement response message transmitted by the data card, and combine the interface identifier and the prefix address to form an IPv6 global unicast address.

FIG. 1 is a schematic structural diagram of a system for stateless automatic configuration of an IPv6 address according to an embodiment of the present disclosure, as shown in FIG. 1, the data card includes a control instruction module, a router message processing module, an IPv6 address processing module and a dialup module; and the terminal includes a host and a PC side software, wherein the host is configured to: when an IPv6 dialup connection is established, transmit a dialup request to the data card; after the connection is successfully established, transmit a router advertisement request message to the data card; receive a router advertisement response message transmitted by the router message processing module, generate randomly an interface identifier according to a prefix address carried in the router advertisement response message, and combine the interface identifier and the prefix address to form an IPv6 address;

the PC side software is configured to call an interface of an operation system to set the IPv6 address to the host after receiving a control instruction carrying the IPv6 address;

the router message processing module is configured to, before establishment of a dialup connection, set and store an IPv6 address configuration way of the data card according to the IPv6 address allocation strategy of the current network; after successful establishment of the IPv6 dialup connection, determine the set IPv6 address allocation way, and when the set IPv6 address allocation way is determined as a static configuration way, discard a router advertisement response message and notify the IPv6 address processing module;

the router message processing module is further configured to, after the set IPv6 address allocation way is determined as a stateless automatic address configuration way, receive a prefix address transmitted by the IPv6 address processing module and return a router advertisement response message carrying the prefix address to the host;

the IPv6 address processing module is configured to acquire a valid IPv6 global unicast address from a PDP activation message after receiving a notification from the router message processing module, and report the IPv6 global unicast address or the prefix address to the control instruction module or the router message processing module according to a current IPv6 address allocation way;

specifically, if an IPv6 address configuration way of current data is static configuration, the IPv6 address is provided to the control instruction module; if the IPv6 address configuration way of the current data is stateless automatic address configuration, the prefix address is returned to the router message processing module.

The control instruction module is configured to transmit a control instruction carrying the IPv6 address to a PC side software; and the dialup module is configured to, when the data card receives a dialup request, initiate a Packet Data Protocol (PDP) activation process, and acquire a valid IPv6 global unicast address from a network side.

Figure 2:
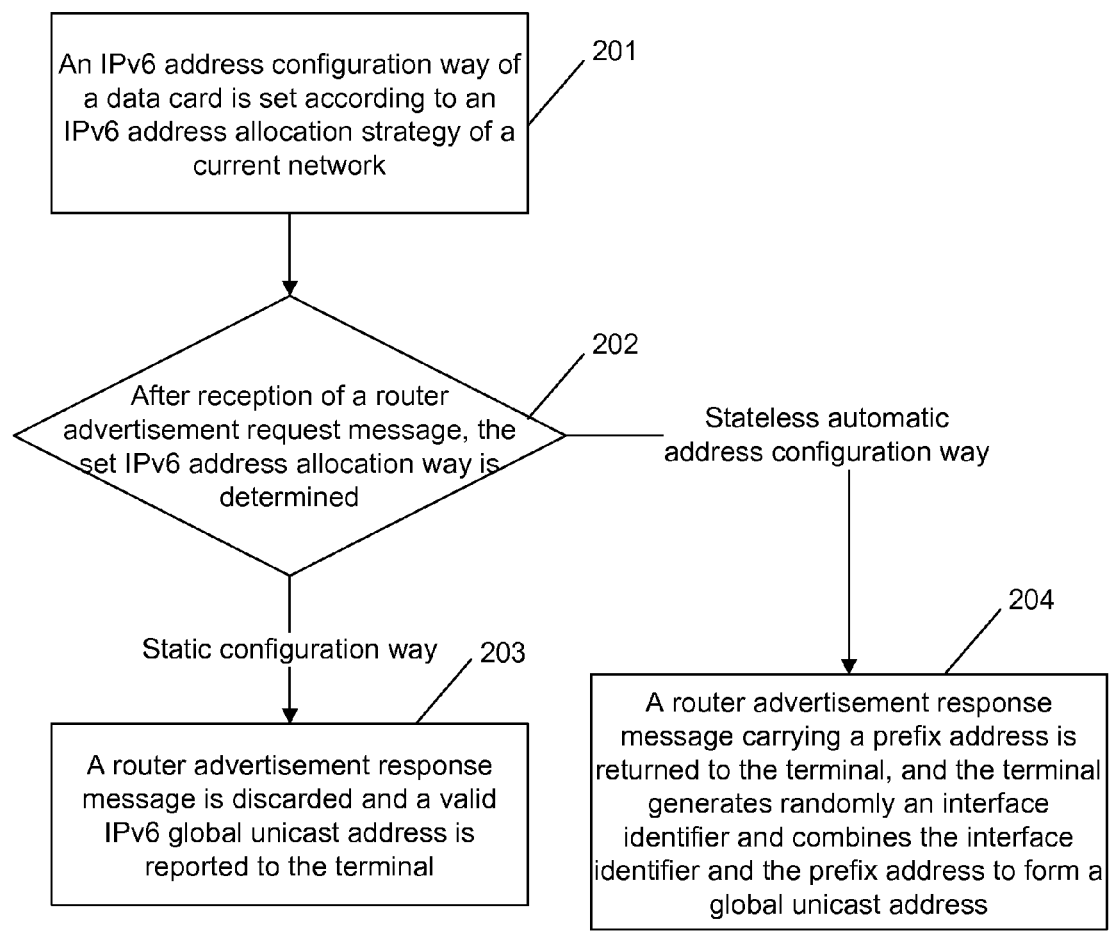
FIG. 2 is a schematic flow chart of a method for implementing stateless automatic configuration of an IPv6 address by a data card according to an embodiment of the present disclosure.

FIG. 2 is a schematic flow chart of a method for implementing stateless automatic configuration of an IPv6 address by a data card according to an embodiment of the present disclosure, as shown in FIG. 2, the method includes the following steps:

step 201, an IPv6 address configuration way of a data card is set according to an IPv6 address allocation strategy of a current network;

specifically, the IPv6 address allocation strategy of the current network is determined before a dialup, if what the current network allocates is a prefix address, the IPv6 address configuration way of the data card is set to a stateless automatic address configuration way which is then stored within the data card itself, in this way, the data card and terminal will generate an IPv6 global unicast address by using a default stateless automatic address configuration way and perform data transmission. if what the current network allocates is an interface identifier, the IPv6 address configuration way of the data card is set to a static configuration way which is then stored within the data card itself, in this way, by means of discarding a router advertisement response message by the data card, the terminal is disabled to generate an IPv6 global unicast address by using normally the stateless automatic address configuration, then the data card reports to the terminal a prefix address and interface identifier allocated by the network through a PDP activation response message, i.e., reporting a valid IPv6 global unicast address, then the terminal can perform data transmission by using the IPv6 address.

Herein, when the IPv6 address configuration method of the data card is set, it can be implemented through an AT instruction, and the operation can be implemented through a PC side software according to specific requirements of an operator. In addition, during practical implementation, regardless of which stateless automatic address configuration way a Domain Name System (DNS) address of IPv6 uses, the DNS address needs to be set statically to a host in the terminal through a PC side software. Therefore, after a connection is established between the data card and the terminal, the data card reports an IPv6 address together with a DNS address, and in order to facilitate a PC side software to distinguish them, it is specified that in the case when a stateless automatic address configuration way is used, an IPv6 global unicast address reported by the data card is all zeros, i.e., the PC side software is notified that the current data card uses a stateless automatic address configuration way, and when a static configuration way is used, a valid IPv6 global unicast address is carried in a reported control instruction, and after detecting the valid IPv6 global unicast address, the PC side software calls an interface of an operation system to set the address to a host in the terminal.

Step 202, after successful establishment of an IPv6 dialup connection and reception of a router advertisement request message transmitted by a terminal for acquiring a prefix address, the data card determines the set IPv6 address allocation way, and if the set IPv6 address allocation way is a static configuration way, proceed to step 203; if it is a stateless automatic address configuration way, proceed to step 204;

specifically, when the IPv6 dialup connection is established, the terminal transmits a dialup request to the data card, the data card initiates a PDP activation process and acquires a valid IPv6 address from a network side. After successful establishment of the IPv6 dialup connection, a host in the terminal transmits a router advertisement request message to the data card, so as to acquire a prefix address from the data card. After receiving the router advertisement request message, the data card determines its own set IPv6 address allocation way, if the allocation way is a static configuration way, proceed to step 203; if the allocation way is a stateless automatic address configuration way, proceed to step 204.

Step 203, a router advertisement response message is discarded and a valid IPv6 global unicast address is reported to the terminal;

specifically, when an IPv6 address configuration way of the data card is a static configuration way, the data card does not return a router advertisement response message, i.e., discard the router advertisement response message, and notifies an IPv6 address processing module within the data card itself to acquire a valid IPv6 address from a PDP activation message, and provides the IPv6 address to a control instruction module; the control instruction module transmits a control instruction carrying the valid IPv6 address to a PC side software; and after receiving the control instruction carrying the valid IPv6 address, the PC side software calls an interface of an operation system to set the IPv6 address to a host in the terminal, and then a negotiation process of the IPv6 address is completed.

Herein since a stateless automatic address configuration function on the host side of the terminal is controlled by an IPv6 protocol stack and it can not be disabled, the disablement can only be implemented through discard of a router advertisement response message on a data card side in embodiments of the present disclosure. After the dialup succeeds, the host transmits the router advertisement request message to the data card, the data card discards a router advertisement response message returned to the host, since the host can not acquire a prefix address through a router advertisement response message, it can not generate randomly an IPv6 address including a randomly-generated interface identifier by using a stateless automatic address configuration way, i.e., the host can not generate a valid global unicast address for data transmission.

Step 204, a router advertisement response message carrying a prefix address is returned to the terminal, the terminal generates randomly an interface identifier, and combines the interface identifier and the prefix address to form a global unicast address;

specifically, when the IPv6 address configuration way of the data card is a stateless automatic address configuration way, the router message processing module in the data card returns to the host in the terminal the router advertisement response message carrying a prefix address, then the router message processing module notifies the IPv6 address processing module not to provide an IPv6 address to the control instruction module, and the IPv6 address processing module needs to return the prefix address to the router message processing module. In this way, a valid IPv6 address is not carried in control information reported to the host by the control instruction module. After receiving the router advertisement response message, the host generates randomly, in a stateless automatic address configuration way, an interface identifier which together with the prefix address forms a 128-bit global unicast address, and then a negotiation process of the IPv6 address is completed.

Processes for implementing embodiments having two different address configuration ways of a data card according to the present disclosure will be described as follows.

Figure 3:
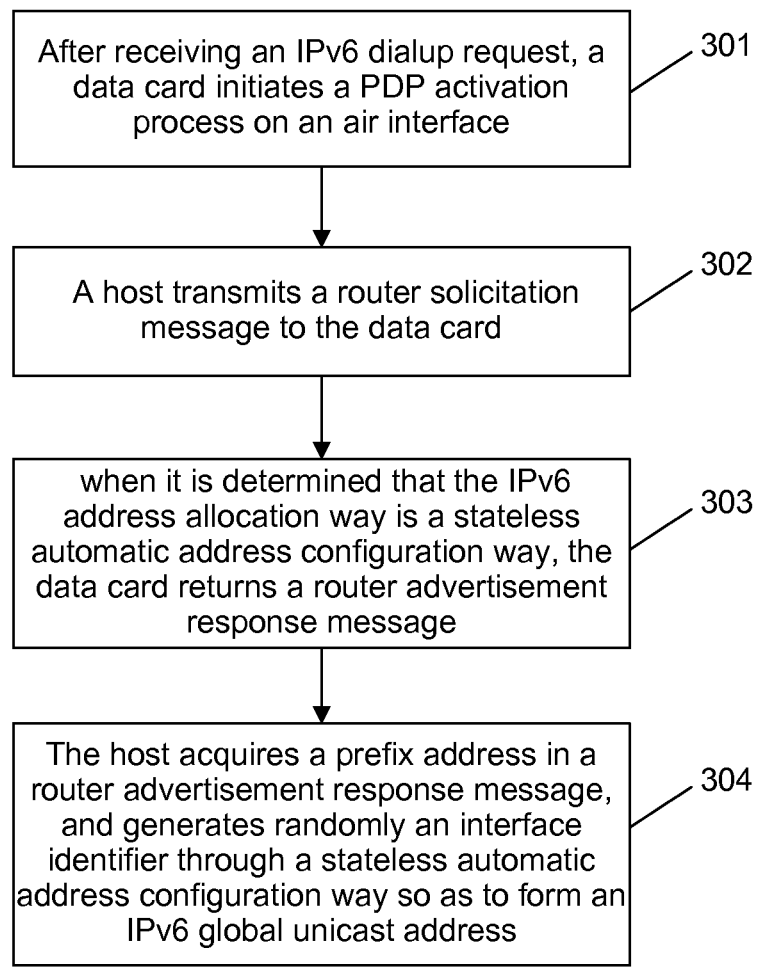
FIG. 3 is a flow chart of an embodiment of a data card for stateless automatic configuration of an IPv6 address according to the present disclosure.

FIG. 3 is a flow chart of an embodiment of a data card for stateless automatic configuration of an IPv6 address according to the present disclosure, as shown in FIG. 3, it includes the following steps:

step 301, after receiving an IPv6 dialup request, a data card initiates a PDP activation process on an air interface;

specifically, PDP context activation request information is transmitted to a Serving GPRS Support Node (SGSN), and the request information includes below information: Access Point Name (APN), PDP type, PDP address, information about Challenge Handshake Authentication Protocol (CHAP) or Password Authentication Protocol (PAP), IPv6 DNS and the like. In an embodiment, the PDP type is IPv6, and the PDP address is null, which indicates a request for dynamic IP address allocation. After receiving the request, a Gateway GPRS Support Node (GGSN) authenticates the terminal through a local Dynamic Host Configuration Protocol (DHCP)/Remote Authentication Dial In User Service (RADIUS), allocates an IPv6 address or a prefix address and other parameters such as a QoS parameter and IPv6 DNS server address, packages an authentication result and respective parameter information into a PDP context activation reception message and transmits it back to the data card, and then the activation process is completed.

Step 302, a host transmits a router solicitation message to the data card;

specifically, after a host in a terminal detects that a port state of an Ethernet equipment is UP, then an address collision detection process is initiated. The host transmits a neighbor solicitation message to the data card and tries to check whether its own interface identifier is unique, when the data card determines that there is collision between an interface identifier address requested by the host and an interface identifier address being used, then the data card transmits a neighbor advertisement to indicate that Duplicated Address Detection fails, then the host generates a new interface identifier and re-transmits the neighbor solicitation message. If no collision is detected, the host will transmit to a Router Solicitation (RS) message to the data card.

step 303, if determining that the IPv6 address allocation way is a stateless automatic address configuration way, the data card returns a router advertisement response message;

specifically, if determining that its own IPv6 address allocation way is a stateless automatic address configuration way, the data card returns a router advertisement response message carrying a prefix address. A way to implement this step is the same as that in step 204, so it will not be elaborated herein.

Step 304, the host acquires a prefix address in a router advertisement response message, and generates an interface identifier through a stateless automatic address configuration way so as to form an IPv6 global unicast address;

specifically, the data card responds to a host in the terminal with an IPv6 prefix address through the router advertisement response message, and after acquiring the prefix address from the router advertisement response message, the host generates randomly, in a stateless automatic address configuration way, an interface identifier which together with the prefix address forms a 128-bit global unicast address, and then a negotiation process of the IPv6 address is completed.

Figure 4:
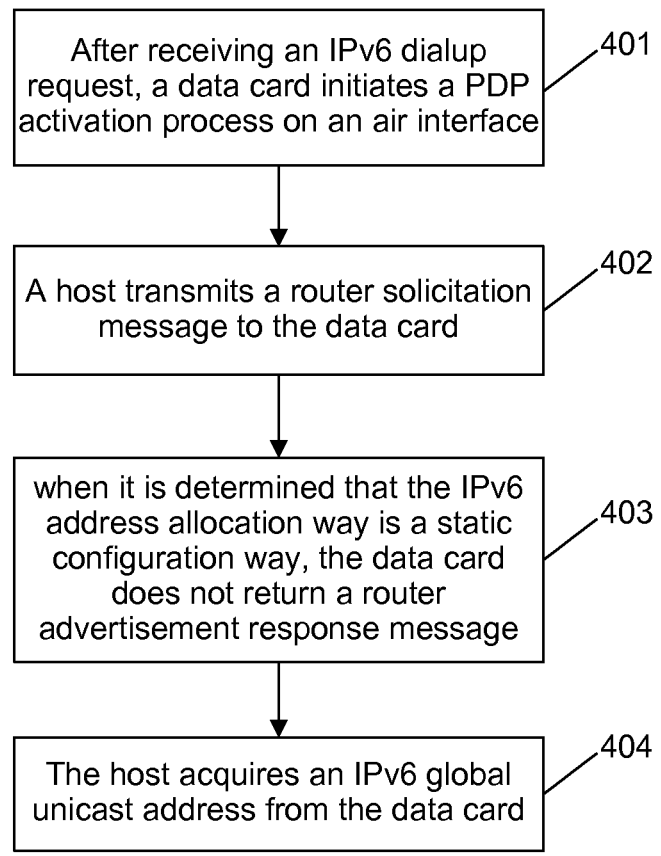
FIG. 4 is a flow chart of an embodiment of a data card for static configuration of an IPv6 address according to the present disclosure.

FIG. 4 is a flow chart of an embodiment of a data card for static configuration of an IPv6 address according to the present disclosure, as shown in FIG. 4, it includes the following steps:

step 401, after receiving an IPv6 dialup request, a data card initiates a PDP activation process on an air interface;

specifically, PDP context activation request information is transmitted to a Serving GPRS Support Node (SGSN), and the request information includes below information: Access Point Name (APN), PDP type, PDP address, information about Challenge Handshake Authentication Protocol (CHAP) or Password Authentication Protocol (PAP), IPv6 DNS and the like. The PDP type is IPv6, and the PDP address is null, which indicates a request for dynamic IP address allocation. After receiving the request, a Gateway GPRS Support Node (GGSN) authenticates the terminal through a local Dynamic Host Configuration Protocol (DHCP)/Remote Authentication Dial In User Service (RADIUS), allocates an IPv6 address or a prefix address and other parameters such as a QoS parameter and IPv6 DNS server address, packages an authentication result and respective parameter information into a PDP context activation reception message and transmits it back to the data card, and then the activation process is completed.

Step 402, a host transmits a router solicitation message to the data card;

specifically, after a host in a terminal detects that a port state of an Ethernet equipment is UP, then an address collision detection process is initiated. The host transmits a neighbor solicitation message to the data card and tries to check whether its own interface identifier is unique, when the data card determines that there is collision between an interface identifier address requested by the host and an interface identifier address being used, then the data card transmits a neighbor advertisement to indicate that Duplicated Address Detection fails, then the host generates a new interface identifier and re-transmits the neighbor solicitation message. If no collision is detected, the host will transmit to a Router Solicitation (RS) message to the data card.

step 403, if determining that the IPv6 address allocation way is a static configuration way, the data card does not return a router advertisement response message;

specifically, when determining that the IPv6 address allocation way is a static configuration way, the data card does not return a router advertisement response message, i.e., the data card discards a router advertisement response message returned to a host in the terminal. Since the host can not receive the router advertisement response message and then can not acquire a prefix address from the router advertisement response message, the host will not generate automatically an IPv6 global unicast address.

Step 404, the host acquires an IPv6 global unicast address from the data card;

specifically, during practical applications, when the host in the terminal fails to generate an IPv6 address, it can acquire an IPv6 address through issuing a control instruction to the data card. The data card notifies an IPv6 address processing module within the data card itself to acquire a valid IPv6 address from a PDP activation message, and provides the IPv6 address to a control instruction module; the control instruction module transmits a control instruction carrying the valid IPv6 global unicast address to a PC side software.

After acquiring an IPv6 global unicast address from a control instruction returned by the data card, the PC side software sets the IPv6 global unicast address to the host in the terminal by way of calling a NetSH network instruction provided by an operation system or modifying IPv6 address information in a registry of the operation system, and then the IPv6 address allocation is completed.

What described are merely preferable embodiments of the present disclosure, and are not intended to limit the present disclosure.

INDUSTRIAL APPLICABILITY

In embodiments of the present disclosure, an existing process for processing a router advertisement message is modified, and in the case that an interface identifier is allocated by a network, a stateless automatic address configuration function of an end host side is disabled through discard of a router advertisement response message returned to a terminal from a data card, then the data card transmits to the terminal a valid IPv6 address allocated by the network through a PDP activation response message. Therefore, it is possible to solve a problem that data transmission can not be normally performed by an existing data card implementing dialup in an Ethernet link way when interface identifiers are allocated by a network.

The invention claimed is:

1. A system for stateless automatic configuration of an IPv6 address, the system comprising a data card and a terminal, wherein
the data card is configured to set and store its own IPv6 address configuration way according to an IPv6 address allocation strategy of a current network, determine the set IPv6 address allocation way after successful establishment of an IPv6 dialup connection and reception of a router solicitation request message transmitted by the terminal for acquiring a prefix address, and when the set IPv6 address allocation way is determined as a static configuration way, discard a router advertisement response message and report a valid IPv6 global unicast address to the terminal; and
the terminal is configured to, after successful establishment of the IPv6 dialup connection, transmit a router solicitation request message for acquiring a prefix address to the data card and receive a valid IPv6 global unicast address reported by the data card;
wherein the data card comprises a control instruction module, a router message processing module, an IPv6 address processing module and a dialup module, wherein
the router message processing module is configured to, before establishment of a dialup connection, set and store an IPv6 address configuration way of the data card according to the IPv6 address allocation strategy of the current network; after successful establishment of the IPv6 dialup connection, determine the set IPv6 address allocation way, and when the set IPv6 address allocation way is determined as a static configuration way, discard a router advertisement response message and notify the IPv6 address processing module;
the IPv6 address processing module is configured to, after receiving a notification transmitted by the router message processing module, acquire a valid IPv6 global unicast address from a Packet Data Protocol (PDP) activation message and provide the IPv6 global unicast address to the control instruction module;
the control instruction module is configured to transmit a control instruction carrying the IPv6 address to a personal computer (PC) side software; and
the dialup module is configured to, when the data card receives a dialup request, initiate a PDP activation process, and acquire a valid IPv6 global unicast address from a network side.

2. The system according to claim 1, wherein the data card is further configured to, after the IPv6 address allocation way is determined as a stateless automatic address configuration way, return a router advertisement response message carrying a prefix address to the terminal;
the terminal is further configured to generate randomly an interface identifier according to a prefix address carried in a router advertisement response message transmitted by the data card, and combine the interface identifier and the prefix address to form an IPv6 global unicast address.

3. A data card for stateless automatic configuration of an IPv6 address, the data card being configured to set and store its own IPv6 address configuration way according to an IPv6 address allocation strategy of a current network, determine the set IPv6 address allocation way after successful establishment of an IPv6 dialup connection and reception of a router solicitation request message transmitted by a terminal for acquiring a prefix address, and when the set IPv6 address allocation way is determined as a static configuration way, discard a router advertisement response message and report a valid IPv6 global unicast address to the terminal;
wherein the data card comprises a control instruction module, a router message processing module, an IPv6 address processing module and a dialup module, wherein
the router message processing module is configured to, before establishment of a dialup connection, set and store an IPv6 address configuration way of the data card according to the IPv6 address allocation strategy of the current network; after successful establishment of the IPv6 dialup connection, determine the set IPv6 address allocation way, and when the set IPv6 address allocation way is determined as a static configuration way, discard a router advertisement response message and notify the IPv6 address processing module;
the IPv6 address processing module is configured to, after receiving a notification transmitted by the router message processing module, acquire a valid IPv6 global unicast address from a Packet Data Protocol (PDP) activation message and provide the IPv6 global unicast address to the control instruction module;
the control instruction module is configured to transmit a control instruction carrying the IPv6 address to a personal computer (PC) side software; and
the dialup module is configured to, when the data card receives a dialup request, initiate a PDP activation process, and acquire a valid IPv6 global unicast address from a network side.

4. The data card according to claim 3, wherein the data card is further configured to, after the IPv6 address allocation way is determined as a stateless automatic address configuration way, return a router advertisement response message carrying a prefix address to the terminal.

5. The data card according to claim 3, wherein the router message processing module is further configured to, after the set IPv6 address allocation way is determined as a stateless automatic address configuration way, receive a prefix address transmitted by the IPv6 address processing module and return a router advertisement response message carrying the prefix address to the terminal;

the IPv6 address processing module is further configured to return the prefix address to the router message processing module.

6. A method for implementing stateless automatic configuration of an IPv6 address, setting and storing an IPv6 address configuration way of a data card according to an IPv6 address allocation strategy of a current network, the method comprising:

after successful establishment of an IPv6 dialup connection and reception of a router solicitation request message transmitted by a terminal for acquiring a prefix address, determining, by the data card, the set IPv6 address allocation way, and when the set IPv6 address allocation way is a static configuration way, discarding a router advertisement response message and reporting a valid IPv6 global unicast address to the terminal;

wherein the step of discarding a router advertisement response message and reporting a valid IPv6 global unicast address to the terminal comprises:

discarding, by the data card, the router advertisement response message, and notifying an IPv6 address processing module within the data card itself to acquire a valid IPv6 global unicast address from a Packet Data Protocol (PDP) activation message, and providing the IPv6 address to a control instruction module; transmitting, by the control instruction module, a control instruction carrying the valid IPv6 global unicast address to a personal computer (PC) side software of the terminal; and after receiving the control instruction carrying the valid IPv6 global unicast address, calling, by the PC side software, an interface of an operation system to set the IPv6 address to a host in the terminal.

7. The method according to claim 6, further comprising:
when the IPv6 address allocation way is a stateless automatic address configuration way, returning a router advertisement response message carrying a prefix address to the terminal, generating randomly, by the terminal, an interface identifier, and combining the interface identifier and the prefix address to form an IPv6 global unicast address.

8. The method according to claim 7, wherein the step of setting an IPv6 address configuration way of a data card according to an IPv6 address allocation strategy of a current network comprises:

determining the IPv6 address allocation strategy of the current network before a dialup, when what the current network allocates is a prefix address, setting the IPv6 address configuration way of the data card to a stateless automatic address configuration way; when what the current network allocates is an interface identifier, setting the IPv6 address configuration way of the data card to a static configuration way, wherein the above setting are implemented through an Attention (AT) instruction.

9. The method according to claim 7, wherein the step of setting an IPv6 address configuration way of a data card according to an IPv6 address allocation strategy of a current network comprises:

determining the IPv6 address allocation strategy of the current network before a dialup, when what the current network allocates is a prefix address, setting the IPv6 address configuration way of the data card to a stateless automatic address configuration way; when what the current network allocates is an interface identifier, setting the IPv6 address configuration way of the data card to a static configuration way, wherein the above setting are implemented through an Attention (AT) instruction.

* * * * *